United States Patent [19]

Scher

[11] 4,112,607
[45] Sep. 12, 1978

[54] FISHING POLE HOLDING APPARATUS

[76] Inventor: Bernard B. Scher, 10702 Haddon, Pacoima, Calif. 91331

[21] Appl. No.: 759,821

[22] Filed: Jan. 17, 1977

[51] Int. Cl.² ............................................. A01K 97/12
[52] U.S. Cl. ........................................ 43/17; 43/55
[58] Field of Search ................... 43/17, 16, 21.2, 55; 403/43

[56] References Cited

U.S. PATENT DOCUMENTS

| | | | |
|---|---|---|---|
| 2,420,363 | 5/1947 | Espenas | 403/43 |
| 2,507,319 | 5/1950 | Peters | 43/55 |
| 2,573,202 | 10/1951 | Kent | 43/55 |
| 2,816,388 | 12/1957 | Hartley | 43/17 |
| 3,285,360 | 11/1966 | Wetsch | 43/17 |
| 3,344,551 | 10/1967 | Chestnut | 43/55 |
| 3,646,697 | 3/1972 | Jennings | 43/17 |

Primary Examiner—Russell R. Kinsey
Assistant Examiner—Daniel J. Leach
Attorney, Agent, or Firm—James E. Brunton

[57] ABSTRACT

A fishing rod holder and signaling apparatus having a generally vertically disposed support member to which a counterbalanced semi-tubular rod holder is pivotally affixed. The support member may be adjustably connected to an outdoor chair or may be inserted into the ground. The rod holder is counterbalanced by a biasing means which acts between a rearwardly extending actuating lever affixed to the rod holder and the support member. A visual-audio signaling device is mounted on the support member directly above the rod holder and is actuated by upward pivotal movement of the actuating lever. An adjustment mechanism is disposed between the biasing means and the support member to permit precise, continuous regulation of the amount of pull on the fish line necessary to actuate the signaling device.

11 Claims, 6 Drawing Figures

FISHING POLE HOLDING APPARATUS

BACKGROUND OF THE INVENTION

1. Field of the Invention

This invention relates generally to fishing equipment and accessories. More particularly, the invention relates to an apparatus for holding a fishing rod and for audibly or visually signaling the fisherman that a fish is feeding on the bait.

2. Discussion of the Prior Art

In recent years, the sport of still fishing has become increasingly popular. To enhance the enjoyment of still fishing, numerous devices have been suggested for holding the fisherman's pole and for signaling the strike of a fish. The basic objective of these devices is to permit the fisherman to cast his line and then leave the rod unattended until he is signaled that a fish has taken the bait. In this way, the fisherman's hands are free to read or attend to other tasks until a strike is made. When the alarm sounds, the fisherman can then set the hook and reel the fish in.

Many of the devices which have been suggested are so elaborate and complicated in operation as to be inefficient and inconvenient in use. Others are poorly engineered and lack the necessary degree of precision to reliably alert the fisherman that a fish is feeding on the bait. Still others are cumbersome in operation, lack versatility and often are so cheaply constructed that they are impractical in use.

The apparatus of the present invention successfully overcomes the various drawbacks of the prior art devices. For example, the apparatus of the present invention, because of its unique rod counterbalance arrangement and cooperating adjustment mechanism, provides such a high degree of sensitivity that even the slightest pull on the line is instantaneously detected. Due to its superior engineering design, the apparatus is extremely lightweight and compact, while at the same time providing unsurpassed reliability. In addition, it is extremely versatile and can be used from a fishing bank for deadline or float fishing, or it can be used from an anchored boat for float fishing. When used for bank fishing, the unique vertical support member of the apparatus can function as a ground stake for convenient insertion into the ground adjacent the stream or lake. Alternatively, the ground stake can be adjustably connected to the leg of an outdoor chair so that the fisherman can sit in his chair and have his fishing rod disposed in close proximity to his arm. The chair connection feature can be beneficial to a handicapped person in a wheelchair. The chair leg connecting means of the apparatus is uniquely designed to provide space for attaching accessories such as a bait holder, tackle holder, or beverage holder.

Because the signaling means of the device emits both audio and visual signals, the apparatus can be used with equal proficiency for either night or day fishing. When used for night fishing, the fisherman need not employ fishing lights to watch the line or float since a strike will instantaneously be signaled by a small light which forms a part of the signaling mechanism.

The novel design of the rod holding and counterbalancing arm of the apparatus, wherein only the tip of the rod handle is encapsulated, permits a quick release of the fishing rod so that when a strike is signaled, the fisherman can immediately and expeditiously remove the rod from the apparatus to freely play the fish unencumbered by the holding and signaling apparatus. In contradistinction, in many of the prior art devices, the fishing rod and reel rests along the entire length of the rod supporting arm, making attachment and expeditious removal of the rod most difficult. In other prior art devices, the complexity of the apparatus requires that the entire rod holder and signal be held while the fisherman plays the fish. Such constructions have proven to be most cumbersome in operation.

Applicant is familiar with the following prior art patents which comprise the closest art known to applicant and which serve to clearly illustrate the novelty of the present invention:
McGuire — 3,888,034, Whitfield — 3,835,568
Wheaton — 3,874,107, Jennings — 3,646,697
Morgan — 3,862,508, Sloan — 3,618,068
Hartley — 2,816,388

SUMMARY OF THE INVENTION

It is the object of the present invention to significantly enhance the pleasure, comfort, and relaxation of the fisherman engaged in still fishing by reducing the monotony of this type of fishing through the use of a novel apparatus for holding the fishing rod and signaling the fisherman should a fish feed on the bait. Use of the apparatus makes it unnecessary for the fisherman to keep the rod under constant surveillance and frees his hands for the performance of other activities.

It is another object of the present invention to provide an apparatus of the aforementioned character which enables detection of the slightest pull on the fishing line and automatically and instantaneously alert the fisherman to the presence of a fish feeding on the bait.

It is another object of the invention to provide an apparatus as described in the preceding paragraph which includes both a visual and audible signaling means for alerting the fisherman whenever a pull is sensed on the fishing line.

It is another object of the invention to provide an apparatus of the aforementioned character in which the rod holder is affixed to a stake type support which may be pressed into the ground adjacent the river or lake or in the alternative, may be adjustably attached to the leg of an outdoor chair. When the apparatus is affixed to the chair, the fisherman can sit in the chair in a normal manner and have his fishing rod disposed in close proximity to his arm.

It is still another object of the invention to provide an apparatus as described in the preceding paragraph which includes a continuous, non-incremental type adjustment mechanism which enables the fisherman to precisely control the amount of pull on the line which would be necessary to activate the signaling mechanism.

It is another object of the invention to provide an apparatus of the aforementioned character in which the rod holder is uniquely designed so that it grips only the tip of the rod handle in a cylindrically shaped chamber while supporting the portion of the handle rearwardly of the reel in a semicircular shaped cradle. With this construction, the rod can be quickly and easily removed from the apparatus to play the fish in a normal manner.

It is a further object of the invention to provide an apparatus of the class described which is lightweight and can be conveniently carried or hung for storage by means of a hook-shaped gripping element provided at the upper extremity of the unit.

Still another object of the invention is to provide an apparatus as described which includes a unique bait holder mechanism rotatably carried by the chair leg connecting means and designed to provide the fisherman with easy access to the bait.

Another object of the invention is to provide a professionally engineered rod holder and signaling device which is rugged, precise, simple to use, extremely reliable and inexpensive to manufacture.

DESCRIPTION OF THE PREFERRED EMBODIMENT

Figure 1:
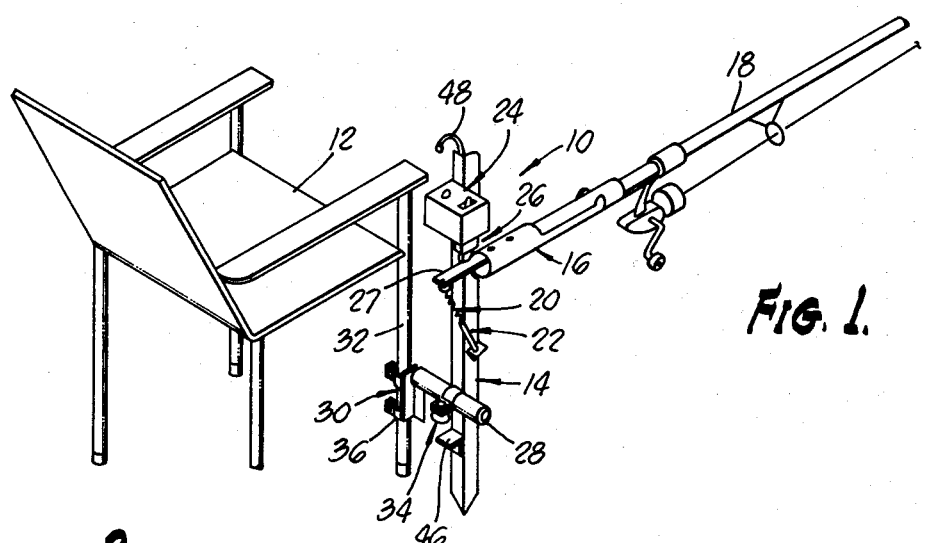
FIG. 1 is a perspective view illustrating the apparatus of the invention for holding a fishing rod and signaling a fish feeding on the bait when used in combination with an outdoor chair.
Figure 2:
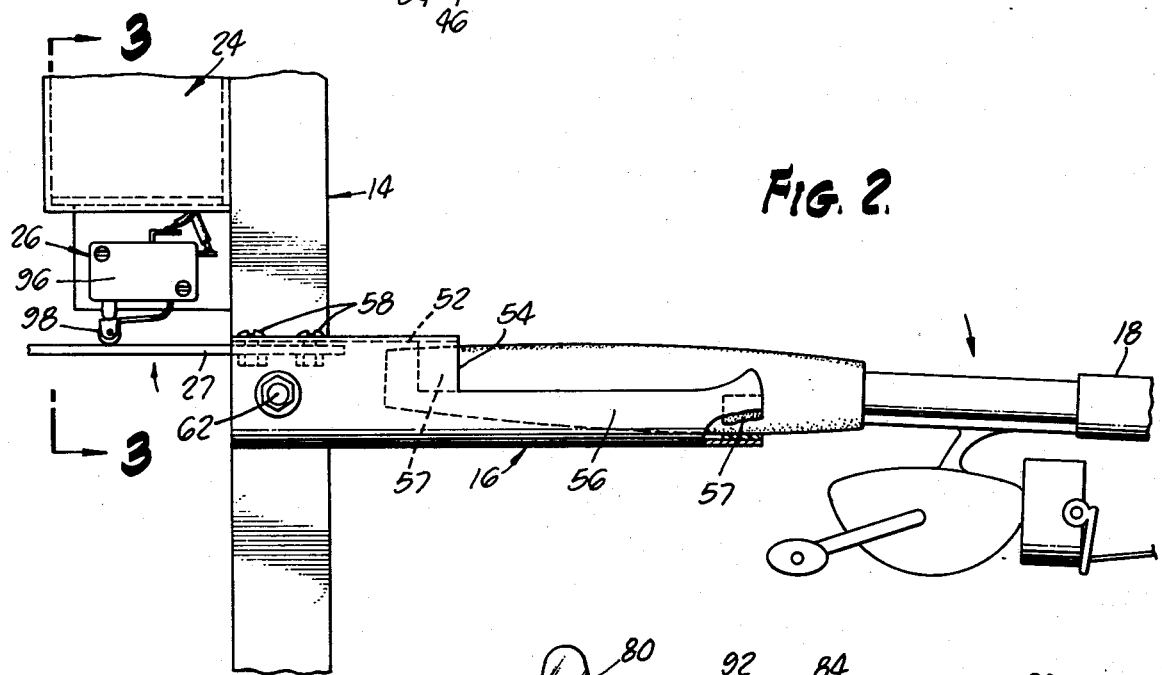
FIG. 2 is an enlarged side elevational view of a portion of the apparatus shown in FIG. 1 illustrating the construction of the rod holding mechanism.
Figure 4:
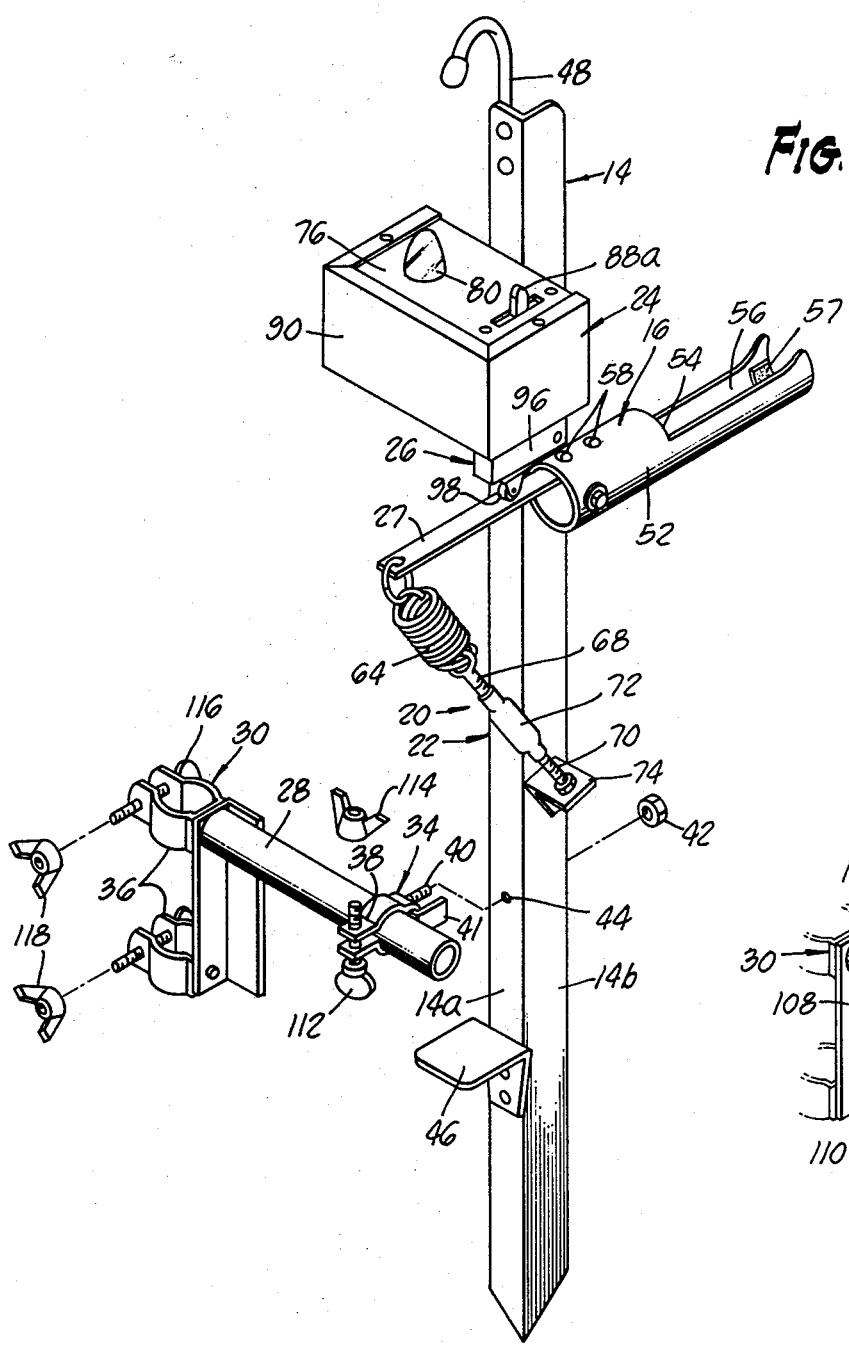
FIG. 4 is a partially exploded perspective view of the apparatus of the invention with the fishing rod removed from the apparatus and the apparatus disconnected from the outdoor chair.

Referring to the drawings and particularly to FIGS. 1, 2 and 4, the apparatus of the invention for holding a fishing rod and signaling a fish feeding on the line is generally designated by the numeral 10. In FIG. 1, the apparatus is illustrated in use in combination with an outdoor chair 12. The major operating elements of the apparatus comprise a first generally vertically disposed support member 14 which operably supports a pivotally mounted rod holding means 16 adapted to hold a standard fishing rod 18 in a forwardly extending cantilever orientation. Acting between the rod holding means and the support member is a biasing means 20 for yieldably resisting rotation of the rod holding means due to the weight of the fishing rod. An adjustment means 22 is operably associated with the biasing means for continuous adjustment of the degree of resistance exerted by the biasing means to rotational movement of the rod holding means. Signaling means 24 are provided for emitting visual and audible signals upon actuation thereof by a sensor means 26 which is responsive to upward rotational movement of the actuating lever portion 27 of the rod holding means 16.

Referring particularly to FIG. 4, the apparatus of the invention also includes second transversely extending support member 28 having a first connecting means 30 at one end thereof for connecting the apparatus to a leg 32 of the outdoor chair (FIG. 1) and second connecting means 34 at the other end thereof for connecting the member to the first support member 14 which is shown in the form of a length of angle iron. In the embodiment of the invention illustrated in the drawings, the first connecting means comprises a pair of clamping elements 36 adapted to be releasably clamped to the leg 32 of the outdoor chair for vertical adjustment relative thereto. Second connecting means 34 is provided in the form of a clamping element 38 which can be releasably clamped to support member 28 for rotational or transverse adjustment relative thereto. A fastening means, shown in the form of a threaded stud 40 and threadably mating nut 42, is connected to clamping element 38. Stud 40 is receivable within an aperture 44 formed in one side 14a of first support member 14 whereby support member 28 can be connected to member 14 by threading nut 42 onto stud 40 and tightening it against side 14a. Also secured by stud 40 is angle bracket 41 which braces side 14b in a manner to restrict sideward motion of support 14.

As will be discussed in greater detail hereinafter, the rod holding apparatus of the invention may be used in combination with an outdoor chair or in the alternative, can be used as a self-contained unit by inserting member 14 into the ground or bank proximate the lake or river being fished. For this latter purpose, first member 14 is pointed at its lower end and includes a foot engaging member 46 to facilitate insertion of the member into the ground. At the upper end of member 14 there is provided a hook-shaped element 48 which may be grasped by the user to hold the support member in a generally upright position while it is being inserted into the ground through exertion of forces against the foot engaging member 46. Hook 48 is used as a grasping means for removal of member 14 from the ground. Hook 48 also provides a convenient means for carrying the apparatus and for hanging the apparatus in a garage or closet when it is not in use.

As best seen by referring to FIGS. 2 and 4, rod holding means 16 of the apparatus includes a first portion 52 having a generally cylindrically shaped rod holding receiving portion 54 and an open top rod cradle portion 56. A resilient cushion 57 is provided within portion 54 and 56 to increase holding friction and prevent marring of the pole. Interconnected to first portion 52 by suitable fasteners such as screws 58 is a second portion comprising the previously mentioned rearwardly extending actuating lever 27. As indicated by the arrows in FIG. 2, the rod holding means 16 is adapted for rotational movement about a transverse pivot axis defined by a bolt 62 connected to first member 14 and located intermediate the first and second portions of the rod holding means. With this construction, the weight of the fishing rod will urge downward rotation of first portion 52 and upward rotation of actuating lever 27 about the pivot axis as illustrated by the arrows in FIG. 2. Referring particularly to FIG. 4, the biasing means 20, shown here in the form of a coiled spring 64, acts between actuating lever 27 and first support member 14. With the construction shown, spring 64 functions to yieldably resist downward rotation of the first portion 52 of the rod holding means due to the weight of the fishing rod.

Forming an important part of the apparatus of the present invention is the adjustment means 22 which is operably associated with the biasing means or spring 64 to enable precise regulation of the degree of resistance exerted by the biasing means against rotational movement of the rod holding means 16. With the fishing rod in an operative position within the apparatus, the adjustment means 22 can be precisely manipulated to yieldably hold the rod holding means in exact nonrotational equilibrium. In prior art structures embodying similar biasing means, only crude incremental tension adjustments were possible. As will be better understood from the description which follows, with the adjustment means of the present invention, precise continuous tension adjustments can be made to the biasing means so that even the slightest force tending to upset the nonrotational equilibrium of the rod holding means can readily be detected.

In the embodiment of the invention shown in the drawings, adjustment means 22 is provided in the form of a turnbuckle of standard construction comprising first and second threaded end portions 68 and 70 and a central internally threaded portion 72. As best seen in FIG. 4, the first end portion 68 of the turnbuckle is attached to the lower end of spring 64 with the second end portion 70 being threadably attached to an angle bracket 74 which is, in turn, affixed to first support member 14. With this construction, rotation of central portion 72 of the turnbuckle will precisely and continuously increase or decrease the amount of tension exerted by spring 64 on actuating lever 27. It is to be appreciated that the turnbuckle could be replaced with a single eye-bolt and wing nut, or with a similar threaded device. The turnbuckle, however, has been found to best provide the degree of control necessary to precisely counterbalance the rod holding means.

Figure 3:
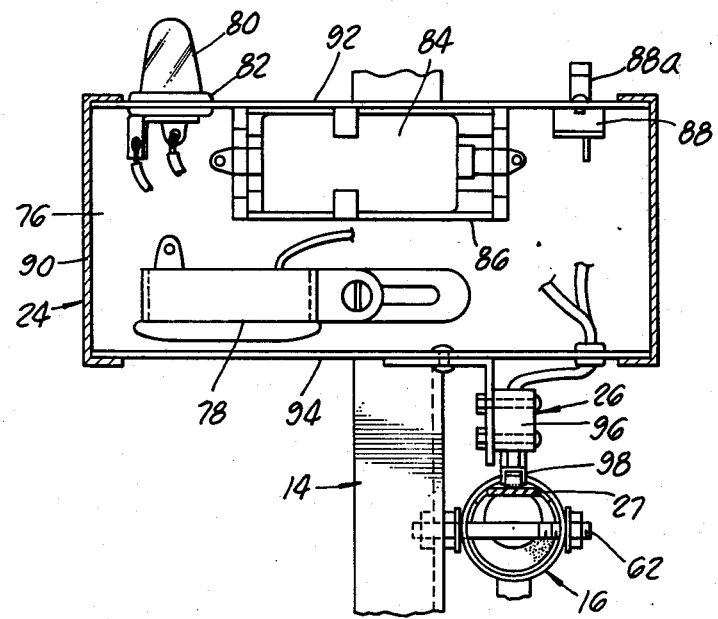
FIG. 3 is a cross-sectional view taken along lines 3—3 of FIG. 2 illustrating the internal construction of the signaling mechanism of the apparatus.

Referring now to FIG. 3, the previously identified signaling means 24 comprises a housing 76 mounted on member 14 immediately above the sensor means 26. In a manner presently to be described in detail, signaling means 24 emits both visual and audible signals upon actuation thereof by the sensor means 26 which is responsive to the upward rotational movement of actuating lever 27. Mounted within housing 76 are both the audible and visual annunciators, along with the circuitry necessary for their operation. The audible annunciator is provided in this form of the invention as a battery-operated buzzer 78, but could be any suitable battery-operated tone generator. The visible annunciator comprises a battery-operated lamp bulb 80 carried within a grommet 82 mounted in the top of the housing. If desired, a rubber or plastic cap may be placed over the bulb for coloration and protection from dirt and moisture. Bulb 80 projects above the top of the housing so as to be readily visible at night. Housing 76 fully encloses buzzer 78 and attenuates the sound level it produces so as not to distract or annoy other fishermen in the vicinity. Both the visual and audible annunciators are powered by a battery 84 which is also mounted within housing 76. Battery 84 is secured by a holder 86 which is resistant to vibration and jarring. The annunciators are selectively controlled by a manual selection slide switch 88 mounted in the top of housing 76. A switch operating arm 88a projects through an aperture formed in the top of the housing and is handily operated. In this embodiment of the invention, switch 88 is a single-pole/triple-throw type which permits selective operation of the annunciators or disconnects the battery during setup, adjustment and storage. Any suitable switch of the toggle or rotary type could, however, be used for this function. The housing is closed by a snap-on type cover 90, having no screws, which slidably engages the margins of the top and bottom walls 92 and 94 of the housing. With this construction, the cover can be easily removed without disturbing the internal circuitry and without the use of tools. The previously identified sensor means 26 is mounted on the bottom wall 94 of housing 76 and is disposed immediately above the second end, or actuating lever portion 27 of the rod holding means 16 (FIG. 2). In the embodiment of the invention here shown, the sensor means is provided in the form of a momentary action snap action switch 96 having an integral switch actuator means in the form of lever roller 98 which is adapted to operably engage actuating lever 27 upon upward rotational movement thereof. Switch 96 is of a type well known in the art and is designed so that the exertion of the slightest pressure on roller 98 will cause the switch to close. Although a variety of switches of various designs could be used, the lever roller type switch has proven most successful. In passing, it is to be noted that the bottom wall 94 of housing 76 is intentionally made resiliently yieldable so that any sharp blows to the switch caused, for example, by someone striking the rod, will be cushioned, thereby preventing damage to the switch.

Figure 5:
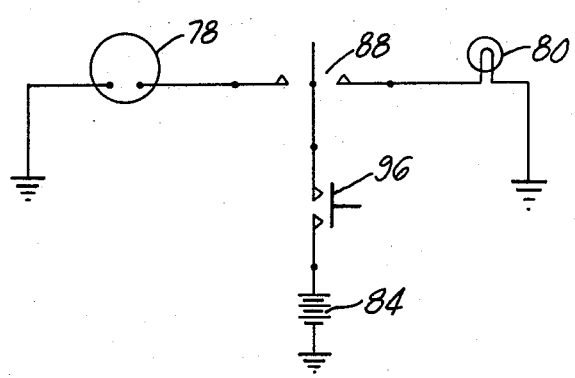
FIG. 5 is a generally schematic view illustrating the electrical circuitry of the signaling mechanism.

In FIG. 5 there is illustrated the circuit means of the invention for operably interconnecting the various elements of the signaling and sensor means of the invention. As shown in FIG. 5, the circuitry is very simple and of a type well known in the art having the battery 84 interconnected to bulb 80 and buzzer 78 through switches 96 and 88.

Figure 6:
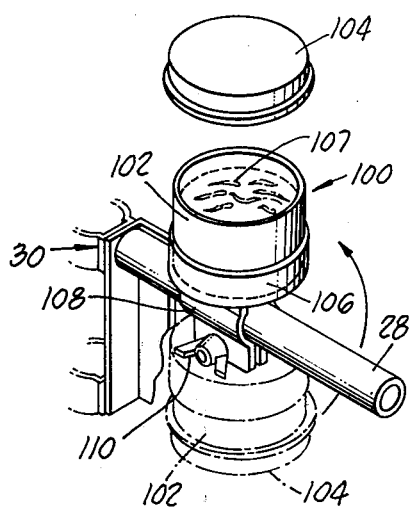
FIG. 6 is a perspective view of the bait holder mechanism of the apparatus.

Turning to FIG. 6 there is shown the construction of the novel bait holder 100 of the invention. In this embodiment of the invention, bait holder 100 comprises a hollow container 102 having a removable top 104. Container 102 is adapted to contain bait, such as worms, and is closely received within a cup-shaped member 106 which is rotatably mounted on transverse second member 28 by means of a clamp 108 affixed to the bottom thereof. By loosening wing nut 110 of the clamp member the entire bait holder assembly can be moved transversely of member 28 and can be rotated from the first top down position shown in the phantom lines of FIG. 6 to the second top up position shown in the solid lines. When the bait holder is not in use, it is maintained in the inverted top down position. In this position, the worms will work their way downwardly within the container toward top 104. When a worm is to be removed, the bait holder is rotated to the top up position. Top 104 can then be removed to permit easy access to the worms 107 which are now located in the upper portion of the container.

OPERATION

The apparatus is conveniently carried to the fishing area by means of hook-shaped handle 48. The fisherman then decides whether he wants the apparatus supported by the outdoor chair or by the ground. If the chair method is selected, transverse member 28 is connected as follows between either the left or right chair leg and support member 14 (FIG. 1). First, clamps 36 are loosely attached to the chair leg. Clamp 38 is then interconnected with member 14 by threaded bolt 40 (FIG. 4) and placed loosely around member 28. Next, clamps 36 are moved downward on the chair leg until the point of support member 14 rests on the ground. Support member 14 can be moved away from or closer to the chair to accommodate the fisherman's reach by sliding clamp 38 along member 28. Support member 14 is placed in a near vertical attitude and clamp 38 is then securely tightened by means of the thumbscrew and wing nuts 112 and 114. Finally, clamps 36 are tightened on the chair leg by means of their thumbscrews and wing nuts 116 and 118. Once attached to the chair leg, support 14 also functions as an outrigger support for the chair to prevent tipping over when unoccupied. If the ground support method is chosen, the hook-shaped handle 48 is grasped to stabilize member 14 in a near vertical attitude while applying foot pressure against the foot engaging member 46. This action causes the pointed end of the support to be inserted into the ground.

Prior to mating the fishing rod with the apparatus, selector switch 88 is placed in the off position. This prevents inadvertent actuation of the signaling means. Then, after casting the line into the water, the fishing rod handle is carefully inserted into receiving portion 54 of the rod holding means 16 so that only the tip portion of the handle engages the rod holding means (FIG. 2). In this position, the semi-tubular cradle portion 56 cradles the forward portion of the handle section. With this construction, the reel is simply supported by the fishing rod in the usual manner, externally to the apparatus, and no provision need be made to accommodate the reel. This feature enables quick and easy removal of the rod from the apparatus.

After the rod is positioned within the rod holding means, the adjustment means is operated to place the precise assembly in nonrotational equilibrium. This is easily accomplished by rotating the central portion 72 of the turnbuckle to increase or decrease the counterbalancing force exerted by the spring 64 on the actuating lever 27. Through manipulation of the turnbuckle, the force exerted by the spring is precisely controlled with no discontinuity of adjustment throughout the entire usable threaded range of the turnbuckle. When the apparatus is in correct equilibrium, the roller 98 of switch 96 just touches actuator lever 27 of the rod holding means.

After correct rotational equilibrium of the apparatus has been achieved, any vertically downward deflection of the rod caused by a feeding fish striking the fishing line causes an opposite upward rotation of actuating lever 27. This vertically upward movement of lever 27 causes roller 98 to instantly actuate switch 96 which, in turn, actuates either the visual or audible annunciators of the signaling means, depending upon the positioning of switch 88. If fishing at night, the visual signal is preferably selected, since it provides the desired tranquility. Selector switch 88, of course, has the capability to operate either the audible annunciator or the visible annunciator, or to disable both. It is considered wasteful of the battery energy to have both annunciators operate simultaneously.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for holding a fishing rod and signaling a fish feeding on the bait comprising:
   (a) a generally vertically disposed support member;
   (b) a rod holding means pivotally connected to said support member for holding the fishing rod in a forwardly extending, cantilevered position, comprising:
      (1) a first portion having a generally cylindrically shaped rod handle receiving portion and a forwardly extending open top rod handle cradle portion which is generally semi-circular in cross-section; and
      (2) a second interconnected portion comprising an actuating lever extending rearwardly of said vertically disposed support member a substantial distance, said rod holding means being adapted for rotational movement about a transverse pivot axis located intermediate said first and second portions of said rod holding means whereby the weight of the rod will urge downward rotation of said first portion about said pivot axis and upward rotation of said actuating lever about said pivot axis against the counter balancing forces exerted by said actuating lever;
   (c) biasing means acting between said actuating lever and said first support member for yieldably resisting upward rotation of said actuating lever;
   (d) adjustment means associated with said biasing means for continuously adjusting the resisting force exerted by said biasing means whereby with the rod in operative position within the apparatus said rod holding means can be yieldably held in precise nonrotational equilibrium;
   (e) signaling means mounted on said first support member for emitting visual and audible signals upon actuation thereof; and
   (f) sensor means disposed intermediate said signaling means and said rearwardly extending actuating lever of said rod supporting means, said sensor means being operably associated with said signaling means and responsive to upward rotational movement of said actuating lever to actuate said signaling means.

2. An apparatus as defined in claim 1 in which said first portion is adapted to encapsulate only the tip portion of the rod handle at a position forwardly of said pivot axis.

3. The apparatus as defined in claim 2 in which said biasing means comprises a coiled spring and said adjustment means comprises a turnbuckle, one end of which is attached to said support member and the other end of which is attached to said coiled spring.

4. An apparatus for holding a fishing rod and signaling a fish feeding on the bait comprising:
   (a) a vertically disposed support member having a pointed lower end adapted to be inserted into the ground;
   (b) a rod holding means having first and second end portions, said means being pivotally mounted on said support member for rotational movement about a transverse pivot axis located intermediate said end portions, said first end portion being generally cylindrical in shape and having an open top rod handle cradle portion adapted to encapsulate only the tip portion of the rod handle forwardly of the pivot axis whereby the weight of the forwardly extending rod will urge upward rotation of said second portion of said rod holding means about said pivot axis, said second portion comprising an actuating lever extending rearwardly of said pivot axis a substantial distance;
   (c) spring means for yieldably resisting upward rotation of said second portion of said rod holding means;
   (d) adjustment means for continuously adjusting the resisting force exerted by said spring means resisting upward rotation of said second portion of said rod holding means whereby with the rod in operative position within the apparatus said rod holding means can be yieldably held in precise nonrotational equilibrium;

(e) sensor means disposed above said rod holding means for engagement with said actuating lever of said second end portion thereof to sense rotational movement of said rod holding means; and (f) signaling means operably associated with said sensor means for emitting a signal when said sensor means senses rotational movement of said rod holding means.

5. The apparatus as defined in claim 4 including resilient cushions provided within said rod handle receiving portion and within said cradle portion of said rod holding means for imparting holding friction to the rod.

6. In combination with an outdoor chair, an apparatus for holding a fishing rod and signaling a fish feeding on the bait comprising:

(a) a first generally vertically disposed support member;

(b) a second transversely extending support member having first connecting means at one end thereof for adjustably connecting said member to a leg of the outdoor chair and second connecting means at the other end thereof for connecting said member to said first support member;

(c) a rod holding means pivotally connected to said first support member for holding the fishing rod in a forwardly extending, cantilevered position, comprising:
 (1) a first portion having a generally cylindrically shaped rod handle receiving portion and an open top rod handle cradle portion; and
 (2) a second interconnected portion comprising a rearwardly extending actuating lever, said rod holding means being adapted for rotational movement about a transverse pivot axis located intermediate said first and second portions of said rod holding means whereby the weight of the rod will urge downward rotation of said first portion about said pivot axis;

(d) biasing means acting between said actuating lever and said first support member for yieldably resisting downward rotation of said first portion of said rod holding means;

(e) adjustment means associated with said biasing means for continuously adjusting the resisting force exerted by said biasing means whereby with the rod in operative position within the apparatus said rod holding means can be yieldably held in precise nonrotational equilibrium;

(f) signaling means mounted on said first support member above said rod holding means for emitting visual and audible signals upon actuation thereof; and (g) sensor means disposed intermediate said signaling means and said actuating lever of said rod supporting means, said sensor means being operably associated with said signaling means and responsive to upward rotational movement of said actuating lever to actuate said signaling means.

7. The apparatus as defined in claim 6 in which said first connecting means comprises at least one clamp member vertically adjustable relative to the leg of the chair and in which said second connecting means comprises at least one clamp member rotationally or transversely adjustable relative to said second support member.

8. The apparatus as defined in claim 6 in which said vertically disposed support member functions as an outrigger stabilizer to prevent tipping of the outdoor chair when unoccupied.

9. The apparatus as defined in claim 6 further including a bait holder rotatably mounted on said second support member intermediate its ends.

10. The apparatus as defined in claim 9 in which said bait holder comprises a hollow container having a removable top, said bait holder being rotatable from a top-up bait removing position to a top-down bait storage position.

11. The apparatus as defined in claim 6 in which said biasing means comprises a coiled spring and said adjustment means comprises a turnbuckle one end of which is attached to said support member and the other end of which is attached to said coiled spring whereby rotation of said turnbuckle can exert tension upon said coiled spring.

* * * * *